(12) United States Patent
Endo et al.

(10) Patent No.: US 6,767,668 B2
(45) Date of Patent: Jul. 27, 2004

(54) SOLID ELECTROLYTE BATTERY AND PRODUCTION METHOD THEREOF

(75) Inventors: Takahiro Endo, Miyagi (JP); Koichiro Kezuka, Miyagi (JP); Tsuyonobu Hatazawa, Miyagi (JP)

(73) Assignee: Sony Corporation, Tokyo (JP)

( * ) Notice: Subject to any disclaimer, the term of this patent is extended or adjusted under 35 U.S.C. 154(b) by 509 days.

(21) Appl. No.: 09/803,685

(22) Filed: Mar. 9, 2001

(65) Prior Publication Data

US 2002/0009636 A1 Jan. 24, 2002

(30) Foreign Application Priority Data

Mar. 10, 2000 (JP) ...................................... P2000-072513

(51) Int. Cl.[7] .............................. H01M 2/02; H01M 2/08
(52) U.S. Cl. ....................... 429/185; 429/163; 429/166; 429/174; 429/178
(58) Field of Search ................................ 429/163, 166, 429/174, 185, 176–181

(56) References Cited

U.S. PATENT DOCUMENTS

| | | | | |
|---|---|---|---|---|
| 4,664,994 A | * | 5/1987 | Koike et al. | 429/163 |
| 4,687,717 A | * | 8/1987 | Kaun et al. | 429/152 |
| 5,714,278 A | * | 2/1998 | Mallinson | 429/126 |
| 6,001,505 A | * | 12/1999 | Fukuda | 429/176 |
| 6,004,693 A | * | 12/1999 | Fukuda | 429/176 |
| 6,251,537 B1 | * | 6/2001 | Kim et al. | 429/181 |

FOREIGN PATENT DOCUMENTS

| | | | | |
|---|---|---|---|---|
| EP | 862227 | * | 9/1998 | ............ H01M/2/02 |
| EP | 1132988 | * | 9/2001 | ........... H01M/10/40 |
| WO | WO 97/08762 | * | 3/1997 | ............ H01M/2/02 |

* cited by examiner

Primary Examiner—Mark Ruthkosky
(74) Attorney, Agent, or Firm—Sonnenschein, Nath & Rosenthal LLP

(57) ABSTRACT

Disclosed is a solid electrolyte battery including: a first electrode including a first collector, and a first active material layer formed on one surface of the first collector with an outer peripheral edge portion of the first collector remaining as a collector exposed portion; a second electrode including a second collector and second active material layers formed on both surfaces of the second collector; and a solid electrolyte interposed between the first electrode and the second electrode; wherein the second electrode is held in the first electrode in such a manner that the first active material layer is opposed to each of the second active material layers via the solid electrolyte, and is sealed in the first electrode by joining the collector exposed portion of the first electrode to each other. This battery is allowed to be further thinned and reduced in weight, to be improved in energy density per weight and energy density per volume, and to be enhanced in air-tightness.

27 Claims, 11 Drawing Sheets

SOLID ELECTROLYTE BATTERY AND PRODUCTION METHOD THEREOF

RELATED APPLICATION DATA

The present application claims priority to Japanese Application No. P2000-072513 filed Mar. 10, 2000, which application is incorporated herein by reference to the extent permitted by law.

BACKGROUND OF THE INVENTION

The present invention relates to a thin type solid electrolyte battery and a production method thereof.

In recent years, along with the progress of the electronic technology, there have been strong demands toward higher performances, miniaturization, and portableness of electronic apparatuses. To meet such demands, batteries used for these electronic apparatuses have been required to have high energy densities, and from this viewpoint, studies have been actively made to develop nonaqueous electrolyte batteries. In particular, lithium batteries or lithium ion secondary batteries, having excellent performances, for example, electromotive forces higher than those of conventional batteries, such as 3 or 4 V, have been adopted for various portable electronic apparatuses such as cam coders, portable telephones, and notebook type personal computers.

Of the above-described lithium ion secondary batteries, a solid electrolyte battery using a solid electrolyte, having merits, for example, a property allowed to be thinned and freely foldable, has been actively studied. Examples of the solid electrolytes may include a gel-like electrolyte composed of a solid electrolyte containing a plasticizer and a high polymer solid electrolyte composed of a high polymer in which a lithium salt is dissolved.

To make effective use of the merits, that is, the characteristics allowed to be thinned and reduced in weight, of these nonaqueous electrolyte batteries, for example, Japanese Patent Laid-open No. Sho 57-115820 has disclosed a nonaqueous electrolyte battery of a type in which a battery element is enclosed by using, as a container, a so-called laminate film formed by holding metal foil or a metal layer such as a metal vapor-deposition layer between resin layers. In this battery, a heat seal layer constituting the innermost layer of the container, that is, the laminate film is made from a resin such as acrylic acid denatured polyethylene or acrylic acid denatured polypropylene ionomer, which resin exhibits a relatively good air-tightness at ordinary temperature. However, batteries mounted on recent electronic apparatuses, for example, personal computers have been required to exhibit a heat resistance at 85° C. In such a high temperature environment, the above-described nonaqueous electrolyte battery may cause a problem that the resin forming the heat seal layer be peeled from the metal layer, thereby degrading the air-tightness of the battery.

To solve the above problem, Japanese Patent Laid-open No. Hei 9-288996 has disclosed a nonaqueous electrolyte battery of a type in which an insulating layer made from a material excellent in a barrier performance against an electrolytic solution such as polyethylene terephthalate is disposed between a heat seal layer constituting the innermost layer and a metal layer of a container. In this battery, by heat-sealing the container in which the insulating layer is provided between the heat seal layer and the metal layer, it is possible to prevent the peeling of the heat seal layer from the metal layer by suppressing permeation of the electrolytic solution between the metal layer and the heat seal layer, and hence to ensure a relatively high air-tightness even in a high temperature environment.

However, in the case of using the container having the above-described heat seal layer for a thin type sheet-like solid electrolyte battery, the container becomes thick because of the presence of the heat seal layer, to thereby increase the total thickness of the solid electrolyte battery. That is to say, because of the container including the heat seal layer, it fails to make effective use of the merits of the solid electrolyte battery, that is, the characteristics allowed to be thinned and reduced in weight. Further, since the proportion of the constituent elements not contributing to the battery reaction to the entire battery becomes large, there occurs an inconvenience that the energy density per weight and the energy density per volume are reduced.

The solid electrolyte battery using the container including the heat seal layer presents another problem that since the resin forming the heat seal layer is exposed from a side surface of the outer peripheral edge portion of the container, the inner side of the heat seal layer is exposed to the electrolytic solution and the outer side thereof is exposed to outside air, with a result that a trace of moisture permeates the interior of the battery through the exposed heat seal layer with elapsed time, thereby deteriorating the cycle characteristic of the battery.

A further problem of the solid electrolyte battery using the container including the heat seal layer is that the width of a so-called sticking margin given to the outer peripheral edge portion of the container must be extended for desirably heat-sealing the container. As a result, since the area of the sticking margin not contributing to the battery reaction becomes large, the energy density of the battery is degraded.

SUMMARY OF THE INVENTION

An object of the present invention is to provide a solid electrolyte battery allowed to be further thinned and reduced in weight, to be improved in energy density per weight and energy density per volume, and to be enhanced in air-tightness, and to provide a method of producing the solid electrolyte battery.

To achieve the above object, according to a first aspect of the present invention, there is provided a solid electrolyte battery including: a first electrode including a first collector, and a first active material layer formed on one surface of the first collector with an outer peripheral edge portion of the first collector remaining as a collector exposed portion; a second electrode including a second collector and second active material layers formed on both surfaces of the second collector; and a solid electrolyte interposed between the first electrode and the second electrode; wherein the second electrode is held in the first electrode in such a manner that the first active material layer is opposed to each of the second active material layers via the solid electrolyte, and is sealed in the first electrode by joining the collector exposed portion of the first electrode to each other.

With this configuration, since the first collector serves as the container, it is possible to eliminate the need of provision of a terminal through which the first electrode is connected to the external and also provision of the container. Further, since the collector exposed portion of the first electrode is directly joined to each other not via a resin for heat seal, it is possible to obtain a significantly desirable air-tightness and also to significantly reduce the area of the collector exposed portion of the first electrode functioning as the joining margin.

To achieve the above object, according to a second aspect of the present invention, there is provided a method of producing a solid electrolyte battery, including the steps of: forming a first active material layer on one surface of a first collector with an outer peripheral edge portion of the first collector remaining as a collector exposed portion, to produce a first electrode; forming second active material layers on both surfaces of a second collector, to produce a second electrode; holding the second electrode in the first electrode in such a manner that the first active material layer is opposed to each of the second active material layers via a solid electrolyte; and joining the collector exposed portion of the first electrode, in which the second electrode has been held in the holding step, to each other, to seal the second electrode in the first electrode.

With this configuration, since the collector exposed portion of the first electrode functioning as the joining margin is directly joined to each other not via a resin for heat seal to be thus sealed, it is possible to produce a thin, lightweight, and air-tight solid electrolyte battery.

DETAILED DESCRIPTION OF THE PREFERRED EMBODIMENTS

Hereinafter, a preferred embodiment of a solid electrolyte battery of the present invention will be described with reference to the drawings.

Figure 1:
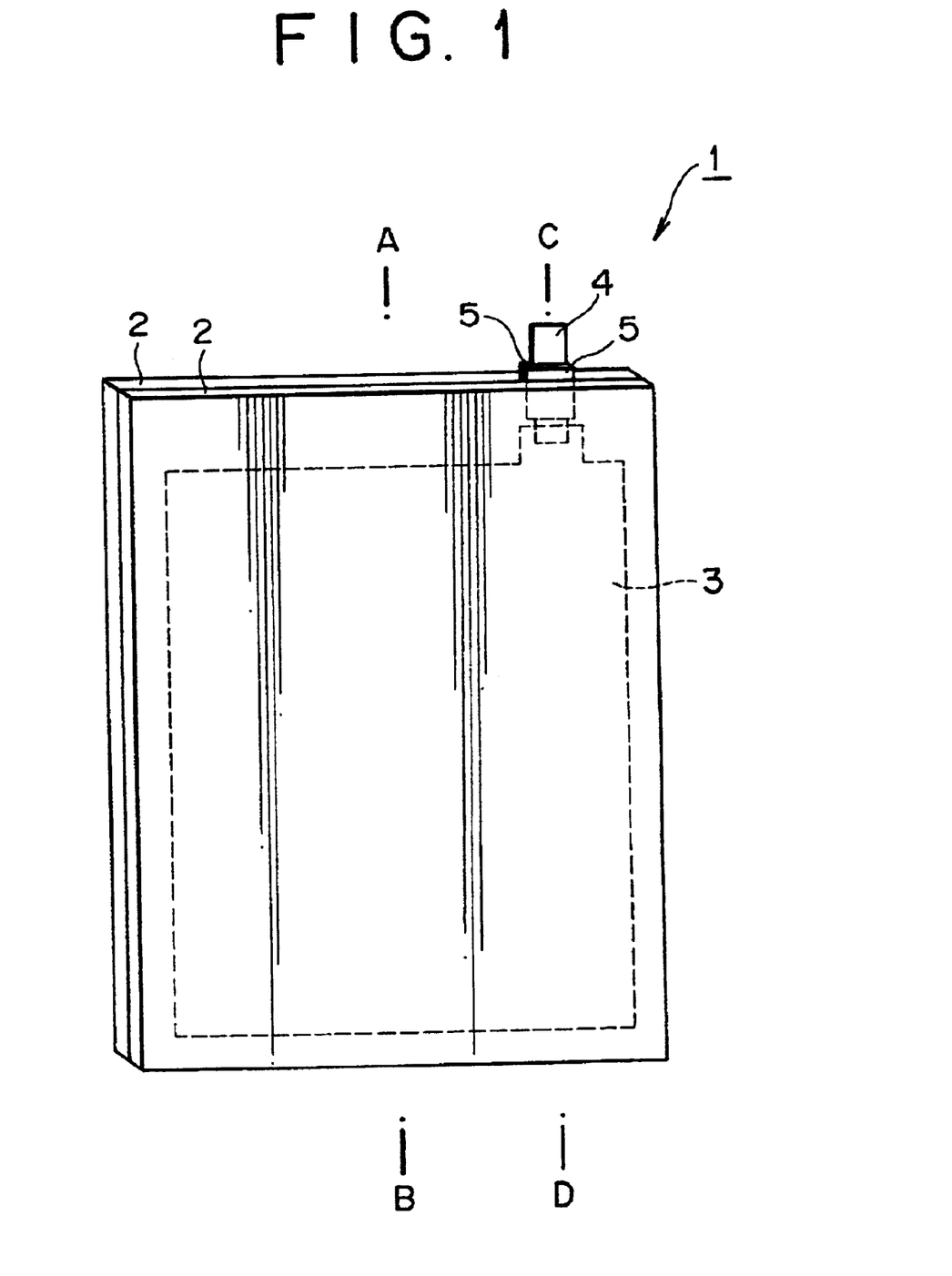
FIG. 1 is a perspective view showing an embodiment of a solid electrolyte battery of the present invention.
Figure 2:
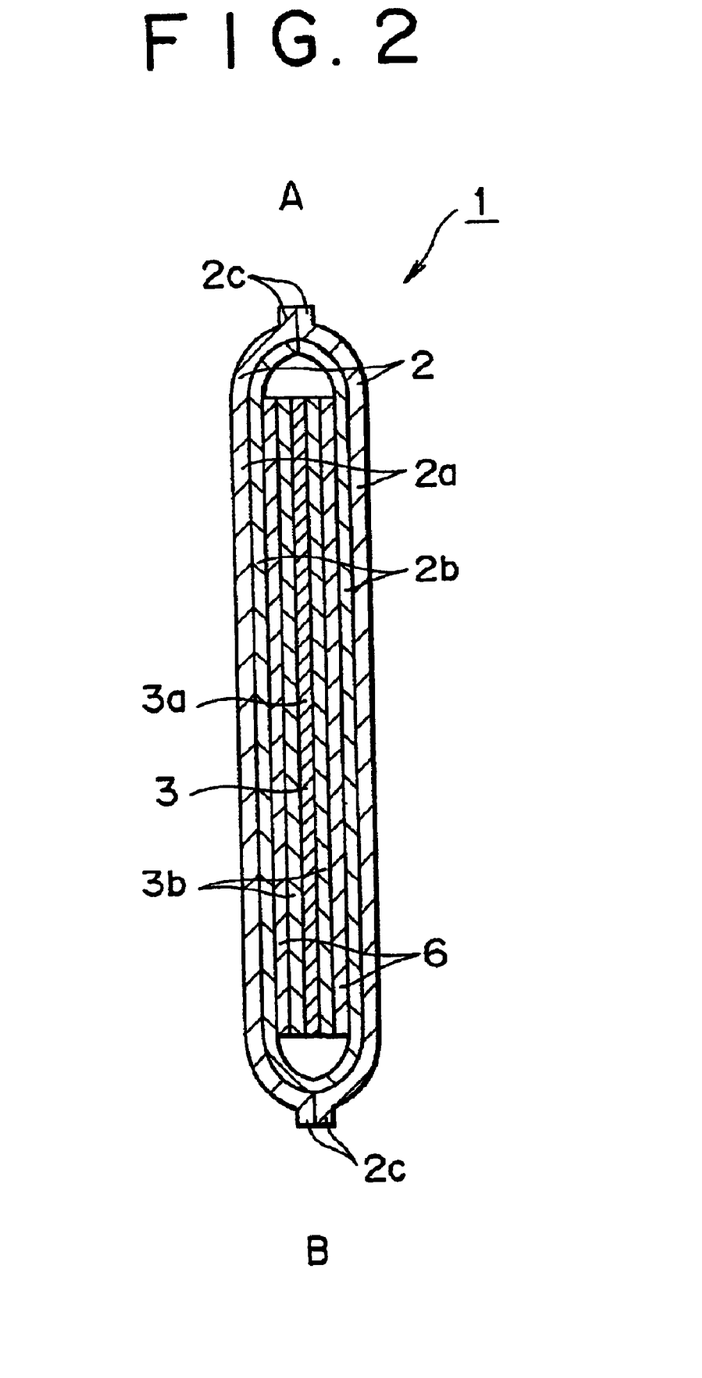
FIG. 2 is a sectional view, taken on line A–B of FIG. 1, showing the solid electrolyte battery shown in FIG. 1.
Figure 3:
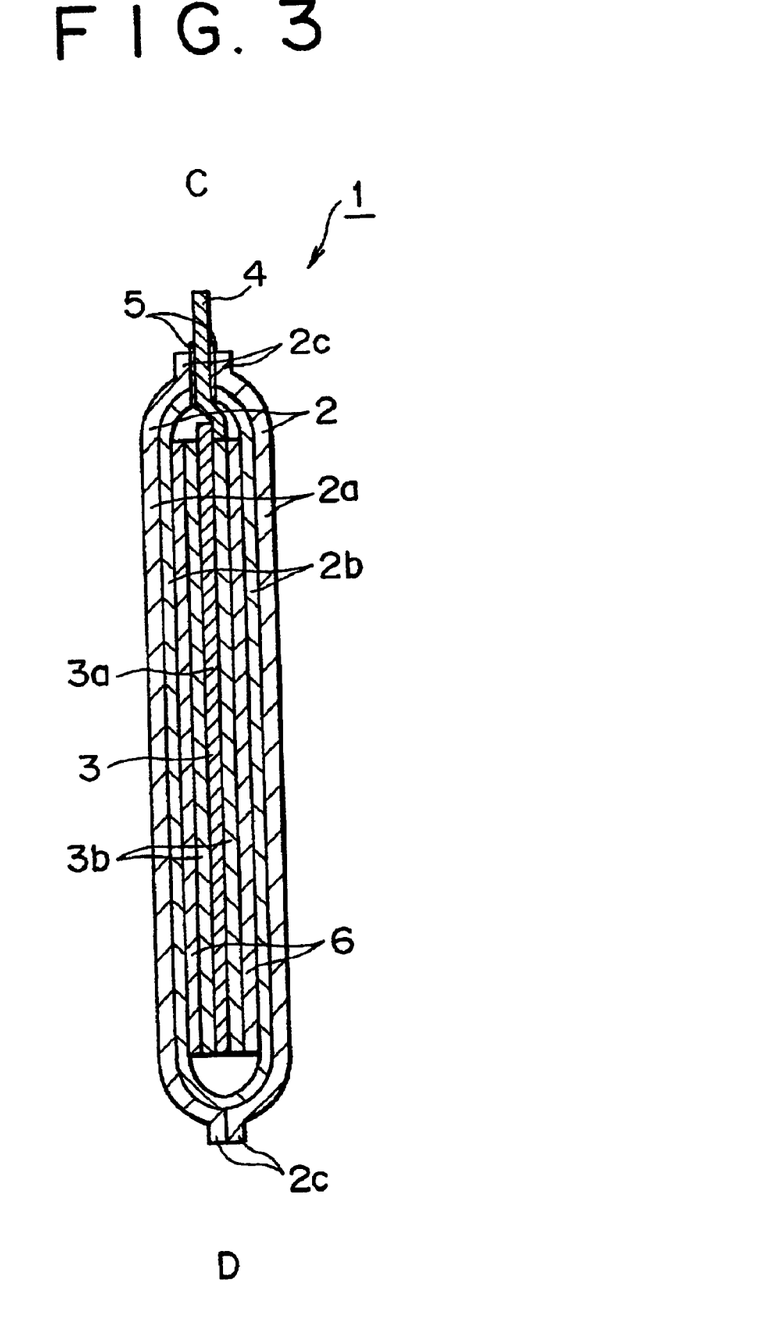
FIG. 3 is a sectional view, taken on line C–D of FIG. 1, showing the solid electrolyte battery shown in FIG. 1.

FIG. 1 is a view showing an embodiment of a solid electrolyte battery in this embodiment; FIG. 2 is a sectional view taken on line A–B in FIG. 1; and FIG. 3 is a sectional view taken on line C–D in FIG. 1. A solid electrolyte battery 1 has a pair of positive electrodes 2 as first electrodes, a negative electrode 3 as a second electrode sealed in the positive electrodes 2, a negative electrode terminal 4 physically, electrically connected to the negative electrode 3, a sealing member 5 disposed between the negative electrode terminal 4 and the positive electrodes 2, and a pair of solid electrolyte layers 6.

The positive electrode 2 has a positive collector 2a and a positive active material layer 2b formed on one surface of the positive collector 2a. The positive active material layer 2b is not formed on the one surface of an outer peripheral edge portion of the positive collector 2a. Such an exposed outer peripheral edge portion is taken as a positive collector exposed portion 2c.

The negative electrode 3 has a negative collector 3a, and negative active material layers 3b formed on both surfaces of the negative collector 3a. At a terminal extraction port formed at a position of the outer peripheral edge portions, butted to each other, of the positive electrodes 2, the negative electrode terminal 4 is covered with the sealing member 5 to be thus insulated from the positive electrodes 2, and is lead to the outside of the solid electrolyte battery 1.

As shown in FIGS. 2 and 3, the negative electrode 3 having the negative active material layers 3b on both surfaces of the negative collector 3a is held between the pair of positive electrodes 2 in such a manner that the negative active material layers 3b are opposed to the positive active material layers 2b with the pair of solid electrolyte layers 6 put therebetween, and the negative electrode 3 is sealed, together with the pair of the solid electrolyte layers 6, in the positive electrodes 2 by joining the positive collector exposed portions 2c, which are formed at the outer peripheral edge portions of the positive electrodes 2 and which function as joining margins, to each other.

In the solid electrolyte battery 1 having the above configuration, the pair of the positive electrodes 2 seal the negative electrode 3 and the solid electrolyte layers 6 therein by joining the positive collector exposed portions 2c to each other with the positive collectors 2a directed outwardly. That is to say, the positive collectors 2a function not only as collectors of the positive electrodes 2 but also as a container for sealing the interior of the solid electrolyte battery 1 from outside air. Accordingly, it is possible to eliminate the need of provision of the container, which has been required to contain a battery element composed of the positive electrodes 2, the negative electrode 3 and the solid electrolyte layers 6.

In particular, since it is not required to provide the container for the thin type sheet-like solid electrolyte battery 1, it is possible to reduce the thickness of the solid electrolyte battery 1, and hence to further thin the battery 1. As a result, it is possible to make full use of the merits, that is, the characteristics allowed to be thinned and reduced in weight, of the solid electrolyte battery 1 using a gel-like electrolyte or a high polymer solid electrolyte, and further, since the need of provision of the container can be eliminated, it is possible to improve the energy density of the battery.

In the conventional battery, since a battery element is sealed by an insulating container, each of the positive electrode 2 and the negative electrode 3 must be lead to the outside via an electrode terminal; however, according to the solid electrolyte battery 1 in this embodiment, since the positive electrodes 2 serve as the container, all of the portions of the battery 1 except for the negative electrode terminal 4 can function as the positive electrode terminal. Accordingly, although only the negative electrode 3 sealed in the battery is required to be provided with a negative electrode terminal, it is possible to eliminate the provision of a new positive electrode terminal for the positive electrode, and hence to realize further lightweightness and space-saving of the solid electrolyte battery 1. Since an electronic apparatus on which the solid electrolyte battery 1 is mounted can be designed with no limitation to a position at which the positive electrode terminal is present, it is possible to realize the lightweightness and space-saving of the electronic apparatus.

According to this solid electrolyte battery 1, the positive collector exposed portions 2c provided at the outer peripheral edge portions of the positive electrodes 2 are used as the joining margins, and are directly joined to each other without use of a resin for heat seal, to seal the negative electrode 3 and the solid electrolyte layers 6. Accordingly, it is possible to prevent moisture from permeating the interior of the solid electrolyte battery 1 via the resin for heat seal and thereby positively keep the air-tightness of the interior of the battery, and hence to prevent the deterioration of the charging/discharging cycle due to permeation of moisture.

Since the positive collector exposed portions 2c provided at the outer peripheral edge portions of the positive electrodes 2 are directly joined to each other not via a resin for heat seal, the width of each of the positive collector exposed portions 2c can be made narrower than that of the related art sticking margin for heat seal. As a result, it is possible to reduce the areas of the positive collector exposed portions 2c not contributing to the battery reaction, and hence to further improve the energy density of the battery.

The negative collector 3a can be formed by metal foil made from copper, nickel, or stainless steel. In the case where being sealed in the solid electrolyte battery 1, the negative collector 3a can be formed into not only the shape of foil but also a shape of lath, punching metal, or network. Taking into account the thinning of the solid electrolyte battery 1, the thickness of the negative collector 3a is preferably in a range of 30 $\mu$m or less.

In the case of applying the solid electrolyte battery 1 of the present invention to a lithium primary battery or a lithium secondary battery, as a negative active material contained in the negative active material layer 3b, there is preferably used lithium, a lithium alloy, or a material into or from which lithium can be doped or released. As the material into or from which lithium can be doped or released, there can be used a carbon material such as a difficult-to-graphitize carbon based material or a graphite based material. Specific examples of these carbon materials may include pyrolytic carbons, cokes, graphites, vitreous carbon fibers, sintered organic high polymer compounds, carbon fibers, and activated charcoals. Specific examples of the above cokes may include pitch coke, needle coke, and petroleum coke. The sintered organic high polymer compound can be produced by sintering phenol resin or furan resin at a suitable temperature, thereby carbonizing the resin.

In addition to the above carbon material, a high polymer such as polyacetylene or polypyrrole, or an oxide such as $SnO_2$ can be used as the material into or from which lithium can be doped or released. Further, as the above-described lithium alloy, there can be used a lithium-aluminum alloy.

As the positive collector 2a, there can be used metal foil made from aluminum, nickel, or stainless steel. In the case where being sealed in the solid electrolyte battery 1, the positive collector 2a can be formed into not only the shape of foil but also a shape of lath, punching metal, or network. Taking into account the thinning of the solid electrolyte battery 1, the thickness of the positive collector 2a is preferably in a range of 30 $\mu$m or less.

As a positive active material contained in the positive active material layer 2b, a metal oxide, a metal sulfide, or a specific high polymer can be used depending on the kind of the battery used.

For example, in the case of applying the solid electrolyte battery 1 of the present invention to a lithium primary battery, $TiS_2$, $MnO_2$, graphite, or $FeS_2$ can be used as the positive active material. In the case of applying the solid electrolyte battery of the present invention to a lithium secondary battery, a metal sulfide such as $TiS_2$, $MOS_2$, or $NbSe_2$, or a metal oxide such as $V_2O_5$ can be used as the positive active material. Further, a transition metal oxide containing lithium expressed by a chemical formula $LiM_xO_2$ (M is one or more kinds of transition metals and x is a value depending on a charging/discharging state of the battery and usually set in a range of 0.05 to 1.10) can be used as the positive active material. The transition metals M contained in the transition metal oxide containing lithium are exemplified by Co, Ni, and Mn. Specific examples of the transition metal oxides containing lithium may include $LiCoO_2$, $LiNiO_2$, $LiN_yCo_{1-y}O_2$ (0<y<1), and $LiMn_2O_4$. such a transition metal oxide containing lithium becomes an excellent positive active material because it can generate a high voltage and ensure a high energy density. From the viewpoint of ensuring a large capacity, an oxide of manganese or a composite oxide of lithium and manganese having a spinel type crystal structure is preferably used as the positive active material. The above-described positive active materials may be used for the positive active material layer 2b singly or in combination.

The solid electrolyte layer 6 may be made from a high polymer solid electrolyte having a diaphragm property and an adhesion property, or a gel-like electrolyte formed by adding a plasticizer to the high polymer solid electrolyte.

For example, the high polymer solid electrolyte is formed by diffusing an electrolyte salt in a matrix polymer.

Specific examples of the electrolyte salts may include $LiPF_6$, $LiClO_4$, $LiCF_3SO_3$, $LiAsF_6$, $LiBP_4$, $LiN(CF_3SO_3)_2$, and $C_4F_9SO_3Li$. These salts can be used singly or in combination. In particular, $LiPF_6$ is desirable from the viewpoint of ion conductivity.

The chemical structure of the matrix polymer is not particularly limited insofar as the matrix polymer itself or the gel-like electrolyte using the matrix polymer exhibits an ion conductivity of 1 mS/cm or more at room temperature. Specific examples of the matrix polymers may include polyvinylidene fluoride, polyacrylonitrile, polyethylene oxide, a polysiloxane based compound, a polyphosphazene based compound, polypropylene oxide, polymethyl metacrylate, polymetacrylonitrile, and a polyether based compound. The above high polymer may be copolymerized with another high polymer. From the viewpoints of chemical stability and ion conductivity, there is preferably used a material produced by copolymerization of polyvinylidene fluoride and polyhexafluoropropylene at a copomerization ratio of less than 8 wt %.

The gel-like electrolyte contains the electrolyte salt, the matrix polymer, and a swelling solvent as a plasticizer.

As the plasticizer used for forming the gel-like electrolyte from the high polymer solid electrolyte, there can be used nonaqueous solvents such as ethylene carbonate, propylene carbonate, γ-butyrolactone, acetonitrile, diethyl ether, diethyl carbonate, dimethyl carbonate, 1,2-dimethoxyethane, dimethyl sulfoxide, 1,3-dioxolane, methyl sulfonate, 2-methyltetrahydrofuran, tetrahydrofuran, sulfolane, 2,4-difluoroanisole, and vinylene carbonate. These nonaqueous solvents can be used singly or in combination.

At the terminal extraction port formed at the position of the positive collector exposed portions 2c butted to each other, the sealing member 5 is disposed at a portion at which the negative electrode terminal 4 is in contact with the positive collector exposed portions 2c. To be more specific, the negative electrode terminal 4 is covered with the sealing member 5 and is held between the positive collector exposed portions 2c, to prevent the negative electrode terminal 4 from being short-circuiting with the positive electrodes 2 due to burrs or the like formed on the positive electrodes 2, and to improve the air-tightness at the terminal extraction port. The material of the sealing member 5 is not particularly limited insofar as it exhibits an adhesive property against the electrode terminal but is preferably selected from polyolefin resins such as polyethylene, polypropylene, denatured polyethylene, denatured polypropylene, and copolymers thereof.

As described above, the pair of positive electrodes 2 seal the negative electrode 3 and the solid electrolyte layers 6 therein by joining the positive collector exposed portions 2c to each other with the positive collectors 2a directly outwardly. Accordingly, since the positive electrodes 2 serve as a container, it is not required to provide a new container and to provide a new terminal for the positive electrodes 2 serving as the container. As a result, it is possible to further thin the solid electrolyte battery 1, to further reduce the weight thereof, and to further improve the energy density thereof.

The pair of positive electrodes 2 seal the negative electrode 3 and the solid electrolyte layers 6 therein by directly joining the positive collector exposed portions 2c provided at the outer peripheral edge portions of the positive electrodes 2 to each other not via a resin for heat seal. Since any resin for heat seal through which moisture may permeate is not used, it is possible to prevent deterioration of the charging/discharging cycle due to permeation of moisture. Further, the width of each of the positive collector exposed portions 2c as the joining margins can be made narrower than that of the related art sticking margin, it is possible to make smaller the areas of the positive collector exposed portions 2c not contributing to the battery reaction, and hence to further improve the energy density of the solid electrolyte battery 1.

The solid electrolyte battery 1 having the above-described configuration is produced as follows:

A positive electrode 2 is produced by forming a positive active material layer 2b on one surface of a positive collector 2a.

One surface of metal foil, for example, aluminum foil, which becomes the positive collector 2a, is uniformly coated with a positive mix containing a positive active material and a binder. In this case, the outer peripheral edge portion of the positive collector 2a is not coated with the positive mix, and remains as a positive collector exposed portion 2c. The positive mix is then dried, to form the positive active material layer 2b. The positive electrode 2 is thus produced. As the binder of the positive mix, a known binder can be used, and further, known additives may be added to the positive mix. The positive active material layer 2b can be also formed by using cast coating or sintering.

The positive collector exposed portion 2c, which is the outer peripheral edge portion, not covered with the positive active material layer 2b, of the positive collector 2a, may be formed by forming the positive active material layer 2b over one surface of the positive collector 2a and removing a portion of the positive active material layer 2b formed on the outer peripheral edge portion of the positive electrode 2, or forming the positive active material layer 2b at a predetermined shape (excluding the outer peripheral edge portion) on one surface of the positive collector 2a by pattern coating or the like. In this way, according to this embodiment, the method of forming the positive collector exposed portion 2c is not particularly limited.

A negative electrode 3 is produced by forming a negative active material layer 3b on one surface of a negative collector 3a.

Both surfaces of metal foil, for example, copper foil, which becomes the negative collector 3a, are uniformly coated with a negative mix containing a negative active material and a binder, followed by drying the negative mix, to form the negative active material layer 3b. The negative electrode 3 is thus produced. As the binder of the negative mix, a known binder can be used, and further, known additives may be added to the negative mix. The negative active material layer 3b can be also formed by using cast coating or sintering.

The order of producing each of the positive electrode 2 and the negative electrode 3 is not particularly limited. For example, the electrode can be produced by forming the active material layer on the collector, and then cutting the collector into a specific shape corresponding to that of the electrode, or cutting the collector into a shape corresponding to that of the electrode, and then forming the active material layer on the collector.

A solid electrolyte layer 6 is formed on each of the negative active material layers 3b formed on both the surfaces of the negative electrode 3. For example, in the case of using a gel-like electrolyte as the solid electrolyte layer 6, a plasticizer is first prepared by dissolving an electrolyte salt in a nonaqueous solvent. A matrix polymer is then added to the plasticizer, and is dissolved therein by agitation, to obtain a sol-like electrolytic solution. The negative active material layer 3b is coated with a specific amount of the electrolytic solution and is left at room temperature until the matrix polymer gels. In this way. the solid electrolyte layer 6 made from the gel-like electrolyte is formed on the negative active material layer 3b.

Similarly, a solid electrolyte layer 6 is formed on the positive active material layer 2b formed on the one surface of the positive electrode 2.

A negative electrode terminal 4 is connected to part of the negative collector 3a of the negative electrode 3. A sealing member 5 made from an insulating material is previously stuck on a portion, to be brought into contact with the exposed portions of the positive collectors 2a, of the negative electrode terminal 4.

Figure 4:
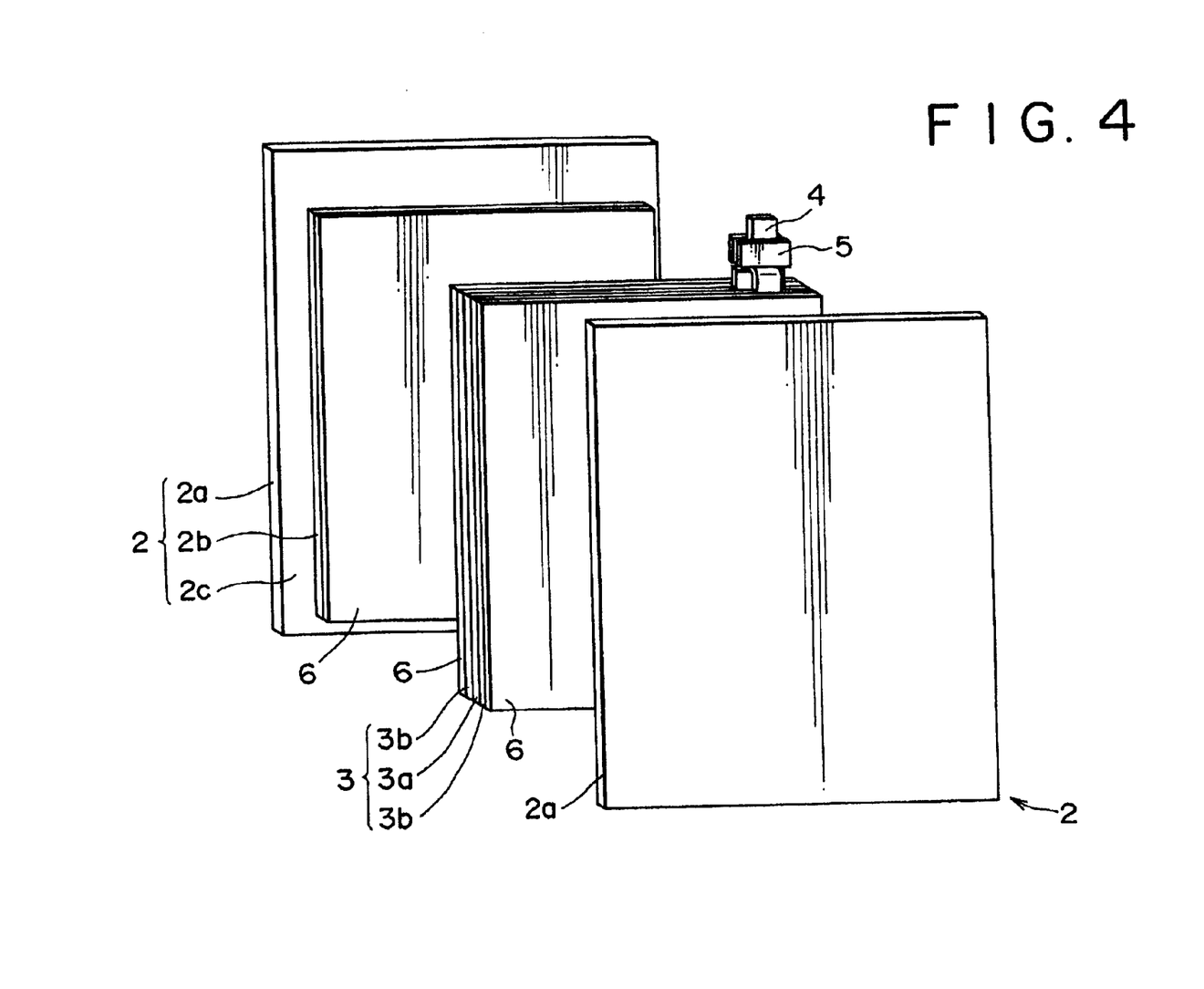
FIG. 4 is a perspective view showing a state in which a negative electrode is held between a pair of positive electrodes.

Next, as shown in FIG. 4, the negative electrode 3 is held between the pair of positive electrodes 2 in such a manner that the positive active material layers 2b are opposed to the negative active material layers 3b via the solid electrolyte layers 6. To be more specific, the positive electrode 2 having the solid electrolyte layer 6 on its one surface, the negative electrode 3 having the solid electrolyte layers 6 on its both surfaces, and the positive electrode 2 having the solid electrolyte layer 6 on its one surface are stacked to each other in such a manner that the solid electrolyte layers 6 are in contact with each other. At this time, the positive collector exposed portions 2c provided at the outer peripheral edge portions of the positive electrodes 2 are aligned and overlapped to each other. The negative electrode terminal 4 connected to the negative electrode 3 is held between the positive collector exposed portions 2c via the sealing member 5, and is led to the outside of the solid electrolyte battery 1.

Figure 5:
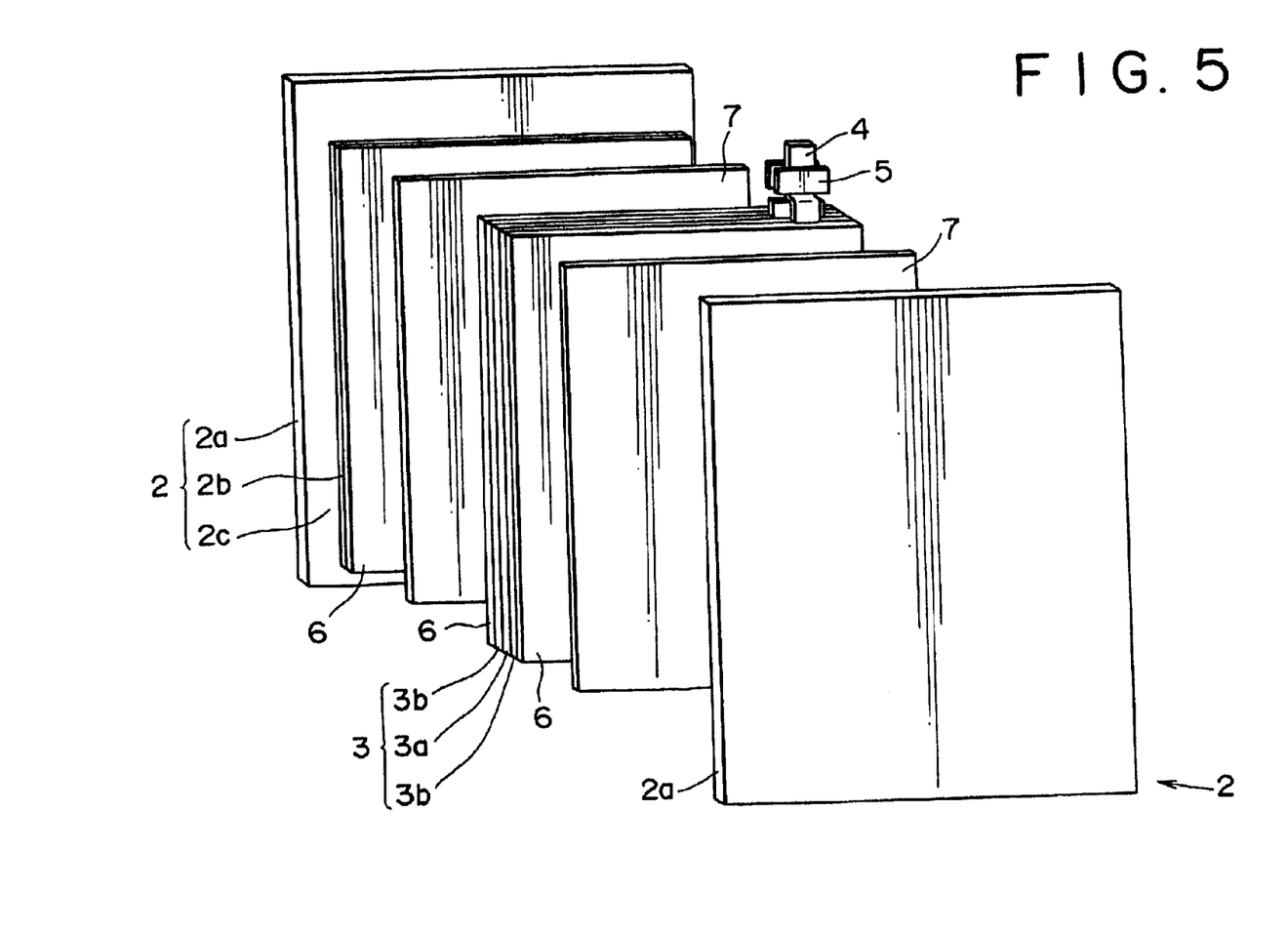
FIG. 5 is a perspective view showing a state in which the negative electrode is held between the pair of positive electrodes via separators.

In the case of using an electrolyte being low in diaphragm characteristic as the solid electrolyte layer 6, to prevent physical contact between the negative electrode 3 and each of the positive electrodes 2, as shown in FIG. 5. a separator 7 may be disposed between the negative electrode 3 and the positive electrode 2. The separator 7 may be made from a porous polyolefin resin or nonwoven fabric cloth.

Finally, the negative electrode 3 is sealed in the pair of the positive electrodes 2 by directly joining the positive collector exposed portions 2c, which have been aligned and overlapped to each other, to each other, to produce the solid electrolyte battery 1 shown in FIGS. 1, 2 and 3.

Here, the positive collector exposed portions 2c can be joined to each other by electron beam welding, laser welding, ultrasonic welding, resistance welding, or pressure welding.

However, at the terminal extraction port for leading the negative electrode terminal 4 to the outside of the solid electrolyte battery 1, the positive collector exposed portions 2c are not directly joined to each other by the above method but is sealed by heat seal via the sealing member 5.

As described above, according to the production method of the present invention, the whole of the outer peripheral edge portions of the positive electrodes 2 serving as the container, excluding the terminal extraction port for the negative electrode 3 put in the positive electrodes 2, are directly joined to each other without use of a resin for heat seal. Accordingly, it is possible to prevent permeation of moisture in the solid electrolyte battery 1, and hence to positively keep the air-tightness of the battery 1.

Further, since the areas of the positive collector exposed portions 2c as the joining margins, which do not contribute to the battery reaction, can be reduced, it is possible to improve the energy density of the battery 1.

In the above-described embodiment, the positive electrodes are used as the first electrodes serving as the container and the negative electrode is used as the second electrode sealed in the first electrodes; however, the present invention is not limited thereto but the negative electrodes may be used as the first electrodes and the positive electrode be used as the second electrode.

Figure 6:
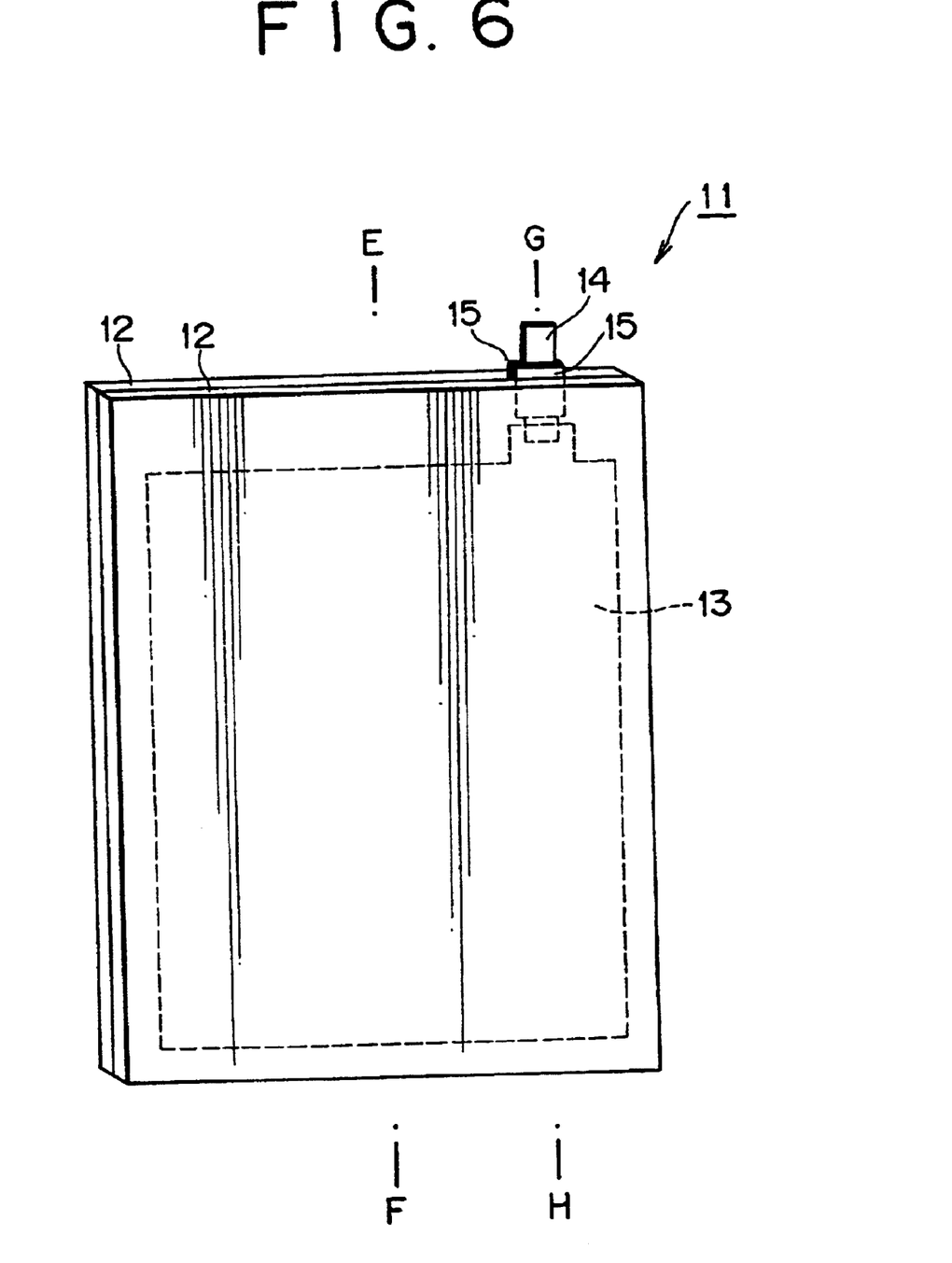
FIG. 6 is a perspective view showing another embodiment of a solid electrolyte battery of the present invention.
Figure 7:
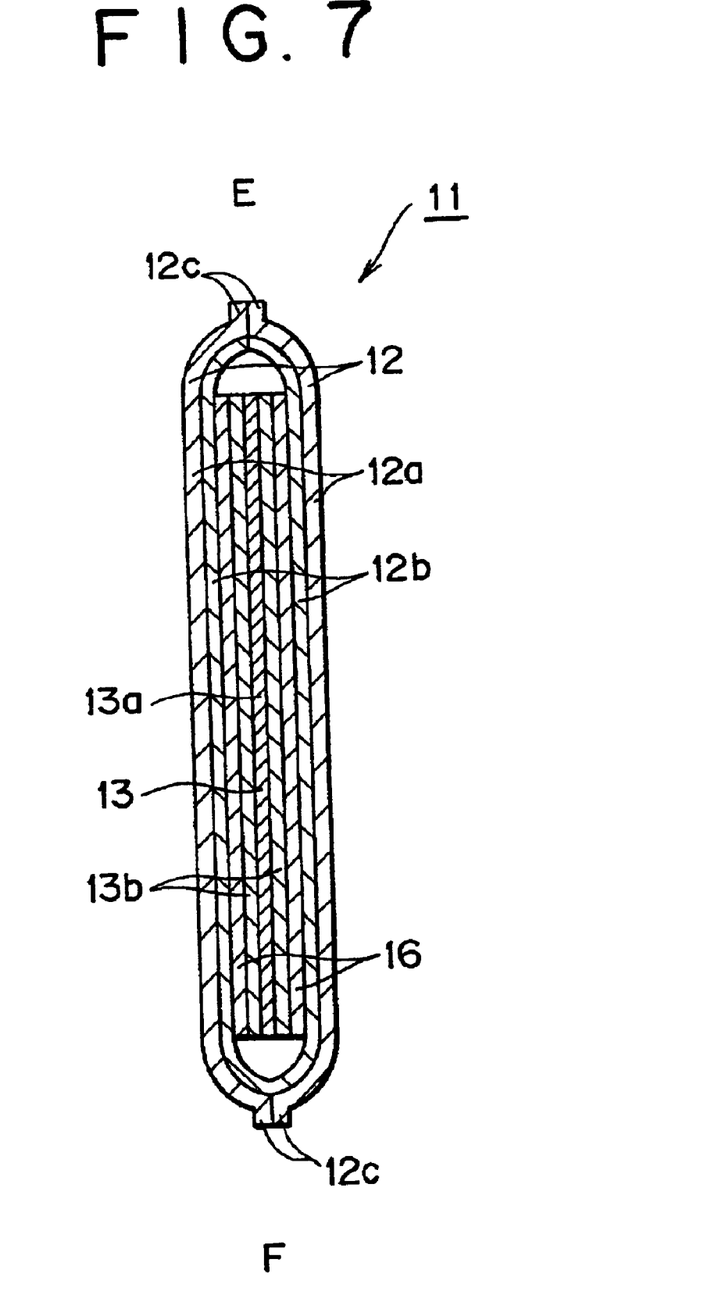
FIG. 7 is a sectional view, taken on line E–F of FIG. 6, showing the solid electrolyte battery shown in FIG. 6.
Figure 8:
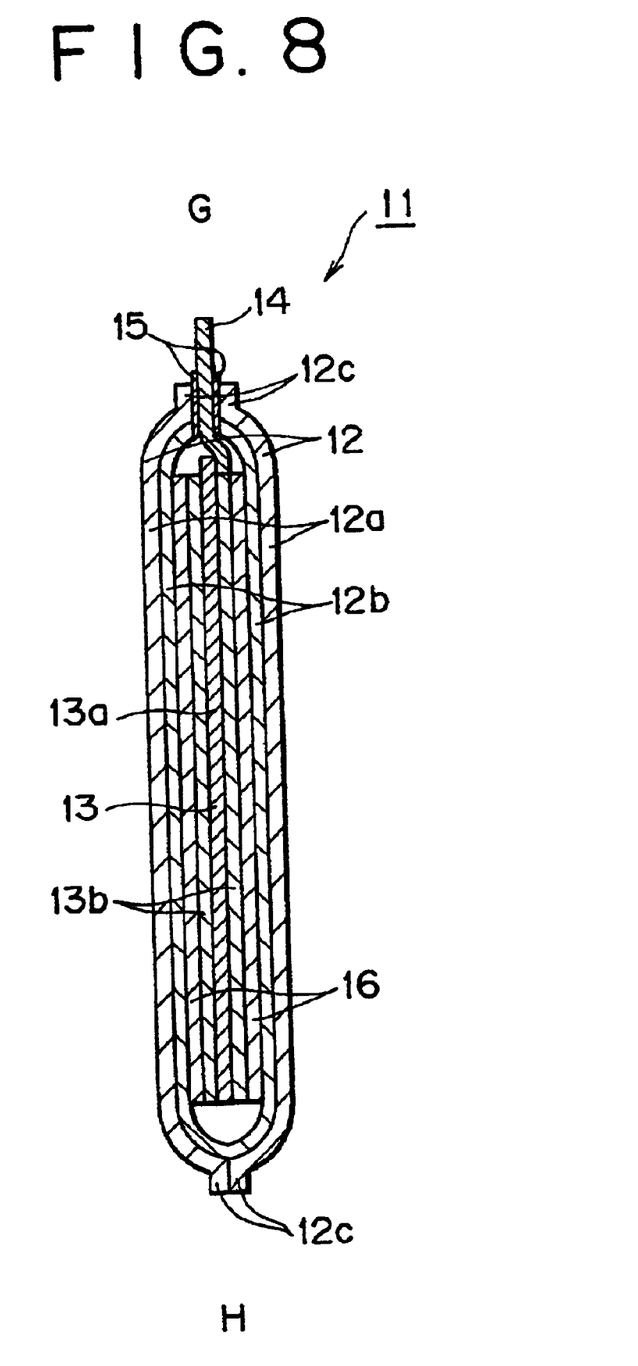
FIG. 8 is a sectional view, taken on line G–H of FIG. 6, showing the solid electrolyte battery shown in FIG. 6.

FIG. 6 is a perspective view showing another embodiment of a solid electrolyte battery of the present invention; FIG. 7 is a sectional view taken on line E–F of FIG. 6; and FIG. 8 is a sectional view taken on line G–H of FIG. 6. A solid electrolyte battery 11 has a pair of negative electrodes 12 as first electrodes, a positive electrode 13 as a second electrode sealed in the negative electrodes 12, a positive electrode terminal 14 physically, electrically connected to the positive electrode 13, a sealing member 15 disposed between the positive electrode terminal 14 and the negative electrodes 12, and a pair of solid electrolyte layers 16.

The negative electrode 12 has a negative collector 12a and a negative active material layer 12b formed on one surface of the negative collector 12a. The negative active material layer 12b is not formed on the one surface of an outer peripheral edge portion of the negative collector 12a. Such an exposed outer peripheral edge portion is taken as a negative collector exposed portion 12c.

The positive electrode 13 has a positive collector 13a, and positive active material layers 13b formed on both surfaces of the positive collector 13a. At a terminal extraction port formed at a position of the outer peripheral edge portions, butted to each other, of the negative electrodes 12, the positive electrode terminal 14 is covered with the sealing member 15 to be thus insulated from the negative electrodes 12, and is lead to the outside of the solid electrolyte battery 11.

As shown in FIGS. 7 and 8, the positive electrode 13 having the positive active material layers 13b on both surfaces of the positive collector 13a is held between the pair of negative electrodes 12 in such a manner that the positive active material layers 13b are opposed to the negative active material layers 12b with the pair of solid electrolyte layers 16 put therebetween, and the positive electrode 13 is sealed, together with the pair of the solid electrolyte layers 16, in the negative electrodes 12 by joining the negative collector exposed portions 12c, which are formed at the outer peripheral edge portions of the negative electrodes 12 and which function as joining margins, to each other.

As described above, the pair of the negative electrodes 12 seal the positive electrode 13 and the solid electrolyte layers 16 therein by joining the negative collector exposed portions 12c, which function as the joining margins, to each other with the negative collectors 12a directed outwardly. In this way, since the negative electrodes 13 serve as the container, it is not required to provide a new container and also to provide a new terminal for the negative electrodes 12 serving as the container. Accordingly, it is possible to further thin the solid electrolyte battery 11, to further reduce the weight thereof, and to further improve the energy density thereof.

The pair of negative electrodes 12 seal the positive electrode 13 and the solid electrolyte layers 16 by directly joining the negative collector exposed portions 12c provided at the outer peripheral edge portions of the negative electrodes 12 to each other not via a resin for heat seal. Since any resin for heat seal through which moisture may permeate is not used, it is possible to prevent deterioration of the charging/discharging cycle due to permeation of moisture. Further, since the width of each of the negative collector exposed portions 12c functioning as the joining margins can be made narrower than that of the related art sticking margin for heat seal, it is possible to reduce the areas of the negative collector exposed portions 12c not contributing to the battery reaction, and hence to further improve the energy density of the solid electrolyte battery 11.

In addition, the solid electrolyte battery 11 shown in FIGS. 6, 7 and 8 in which the negative electrodes are used as the first electrodes and the positive electrode is used as the second electrode has the same basic configuration as that of the solid electrolyte battery 1 shown in FIG. 1, except that the positive electrodes and the negative electrode in the battery 1 are replaced with the negative electrodes and the positive electrode in the battery 11, respectively. Accordingly, the overlapped description of each component in the battery 11, corresponding to that in the battery 1, is omitted.

Each of the batteries 1 and 11 according to the above-described embodiments is configured so that the pair of the first electrodes serving as the container seal the second electrode and the solid electrolyte layers by joining the collector exposed portions to each other with the collectors of the first electrodes directed outwardly; however, the present invention is not limited thereto. For example, the present invention may be applied to a configuration in which one first electrode serving as a container is used in place of the pair of the first electrodes described in each of the batteries 1 and 11. In this configuration, the first electrode is folded into two so as to hold the second electrode therein, to thereby seal the second electrode together with the solid electrolyte layers.

Figure 9:
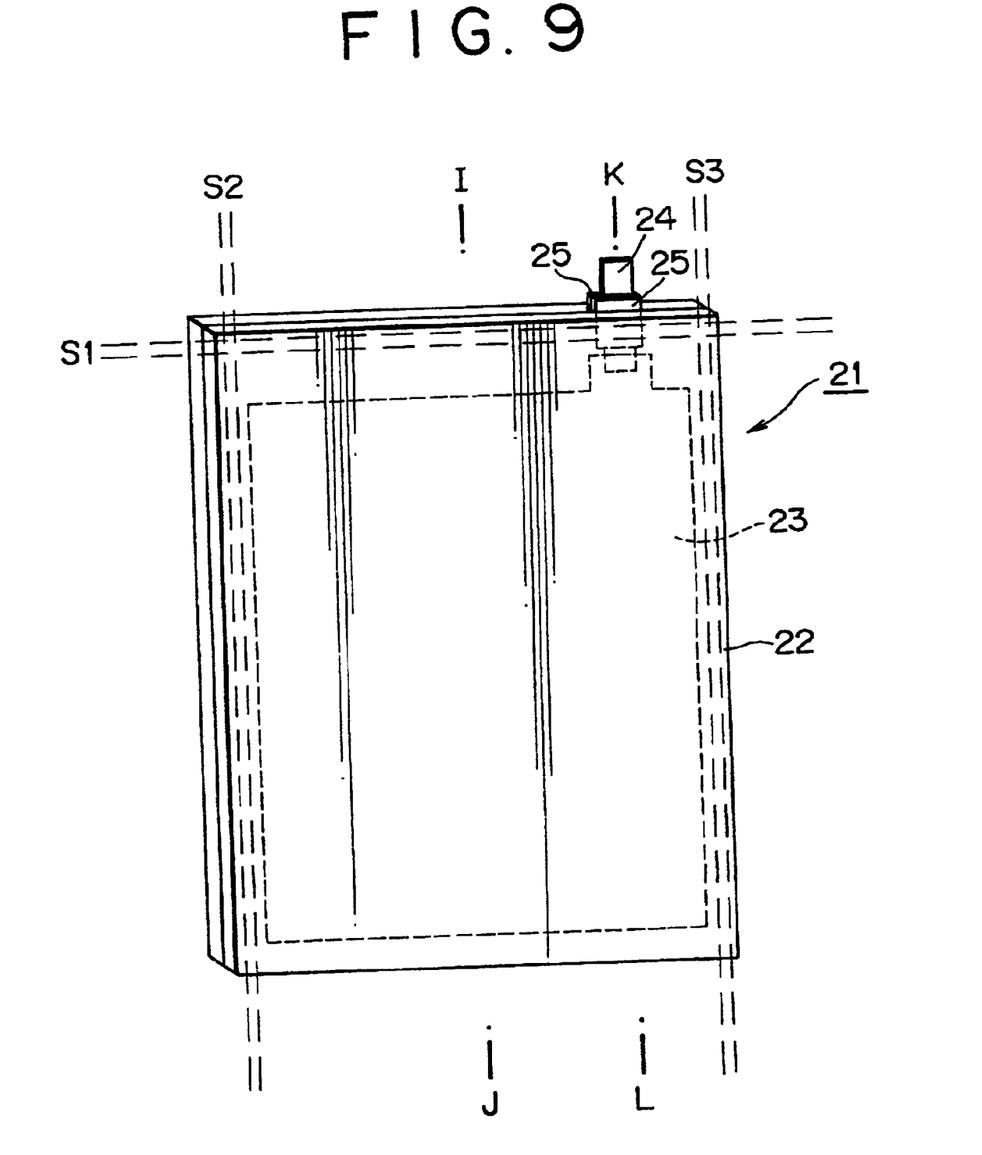
FIG. 9 is a perspective view showing further another embodiment of a solid electrolyte battery of the present invention.
Figure 10:
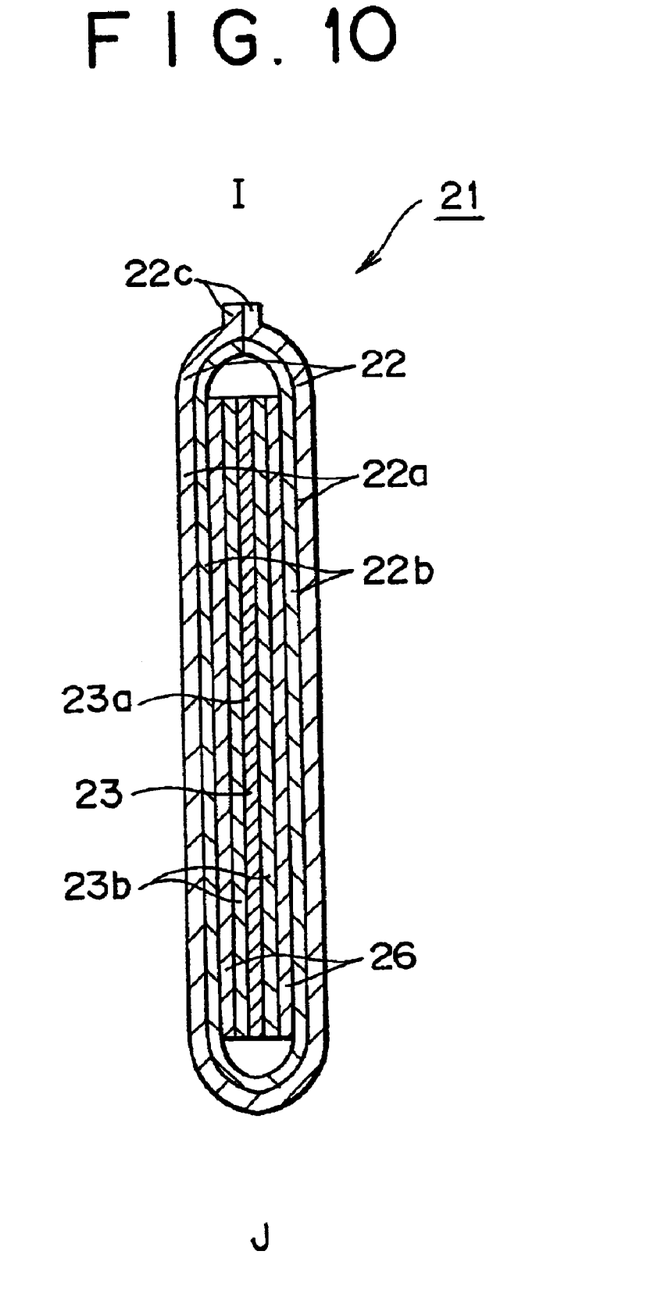
FIG. 10 is a sectional view, taken on line I–J of FIG. 9, showing the solid electrolyte battery shown in FIG. 9.

FIG. 9 is a perspective view of a further embodiment of a solid electrolyte battery of the present invention, in which only one first electrode serving as a container is used; FIG. 10 is a sectional view taken on line I–J of FIG. 9; and FIG.

Figure 11:
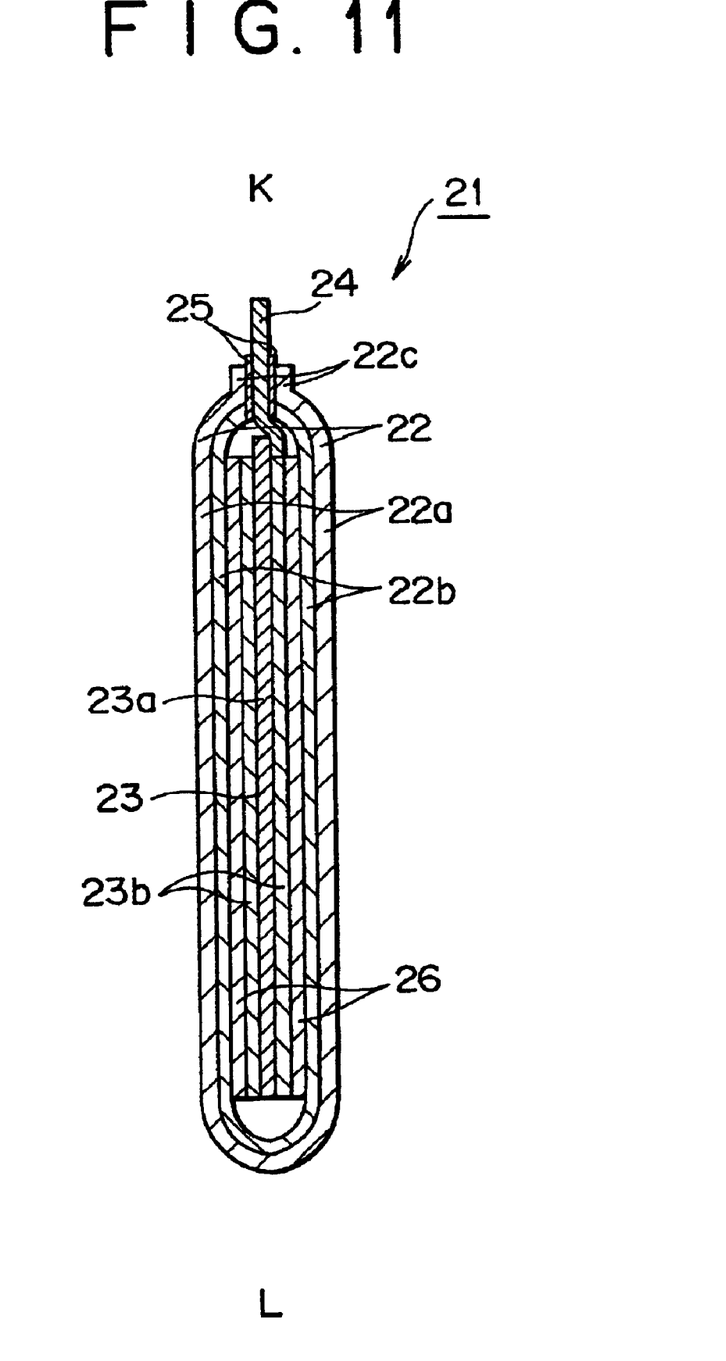
FIG. 11 is a sectional view, taken on line K–L of FIG. 9, showing the solid electrolyte battery shown in FIG. 9.

11 is a sectional view taken on line K–L of FIG. 9. A solid electrolyte battery 21 includes a positive electrode 22 as a first electrode, a negative electrode 23 as a second electrode sealed in the positive electrode 22, a negative electrode terminal 24 physically, electrically connected to the negative electrode 23, a sealing member 25 disposed between the negative electrode terminal 24 and the positive electrode 22, and solid electrolyte layers 26.

The positive electrode 22 has a positive active material layer 22b formed on one surface of the positive collector 22a. The positive active material layer 22b is not formed on the one surface of the outer peripheral edge portion of the positive collector 22a. Such an exposed outer peripheral edge portion is taken as a positive collector exposed portion 22c. Since the positive electrode 22 is folded into two so as to seal the negative electrode 23 therein, the size of the positive electrode 22 is set to be substantially twice the size of the negative electrode 23 so that one of the folded pieces of the positive electrode 22 becomes nearly equal to that of the negative electrode 23.

The negative electrode 23 has a negative collector 23a, and negative active material layers 23b formed on both surfaces of the negative collector 23a. At a terminal extraction port formed at a position of the outer peripheral edge portion of the positive electrode 22, the negative electrode terminal 24 is covered with the sealing member 25 to be thus insulated from the positive electrode 22, and is led to the outside of the solid electrolyte battery 21.

As shown in FIGS. 10 and 11, by folding the positive electrode 22 into two, the negative electrode 23 having the negative active material layers 23b on both the surfaces of the negative collector 23a is held in the folded positive electrode 22 in such a manner that the negative active material layers 23b are opposed to the positive active material layer 22b via the solid electrolyte layers 26. At the same time, by joining the positive collector exposed portion 22c formed at the outer peripheral edge portion of the positive electrode 22 to each other on each of three sides S1, S2 and S3 of the positive electrode 22, the negative electrode 23 is sealed, together with the solid electrolyte layers 26, in the positive electrode 22.

As described above, the positive electrode 22 seals the positive active material layer 22b, the negative electrode 23, and the solid electrolyte layers 26 by folding the positive electrode 22 into two with the positive collector 22a directed outwardly, and then joining the positive collector exposed portion 22c to each other. In this way, since the positive electrode 22 serves as the container, it is not required to provide a new container and also to provide a new terminal for the positive electrode 22 serving as the container. As a result, it is possible to further thin the solid electrolyte battery 21, to further reduce the weight thereof, and to further improve the energy density thereof.

The positive electrode 22 seals the negative electrode 23 and the solid electrolyte layers 26 by directly joining the positive collector exposed portion 22c provided at the outer peripheral edge portion of the positive electrode 22 to each other not via a resin for heat seal. Since any resin for heat seal through which moisture may permeate is not used, it is possible to prevent deterioration of the charging/discharging cycle due to permeation of moisture. Further, since the width of the positive collector exposed portion 22c functioning as the joining margin can be made narrower than that of the related art sticking margin for heat seal, it is possible to reduce the areas of the positive collector exposed portion 22c not contributing to the battery reaction, and hence to further improve the energy density of the solid electrolyte battery 21.

In addition, the solid electrolyte battery 21 shown in FIGS. 9, 10 and 11 has the same basic configuration as that of the solid electrolyte battery 1 shown in FIG. 1, except that in the battery 21, one positive electrode as the first electrode is folded into two so as to hold the negative electrode and the solid electrolyte layers therein. Accordingly, the overlapped description of each component in the battery 21, corresponding to that in the battery 1, is omitted.

As described above, the first electrode may be configured as either of the negative electrode and the positive electrode and the second electrode be configured as the other of the negative electrode and the positive electrode; however, the first electrode serving as the container is preferably configured as the negative electrode. The use of the negative electrode as the first electrode capable of ensuring a larger area is effective to suppress precipitation of lithium at the time of charging of the battery.

In each of the above-described solid electrolyte batteries, the thickness thereof is preferably in a range of 2 mm or less, more preferably, 1 mm or less. In general, for a thin type battery, since the container has a certain thickness and a certain weight, the effect of the container exerted on the volume and weight of the entire battery becomes larger as compared with a battery having a relatively large thickness, with a result that the loss in energy density per volume and energy density per weight becomes significant by the presence of the container. According to the present invention, however, since it is not required to additionally provide the container, the present invention can be applied to a thin type sheet-like solid electrolyte battery. As a result, it is possible to fully achieve the effects of the present invention, that is, the thinning, lightweightness, and higher energy density of the battery.

In the above-described embodiments, the metal foil constituting the collector is taken as the outermost layer of the battery, and thereby it functions as a container; however, the present invention is not limited thereto. For example, the other surface, on which the active material layer is not formed, of the collector may be provided with a cover layer as the outermost layer of the battery by coating the other surface of the collector with nylon or the like. The provision of the cover layer is effective to impart a strength to the collector formed of the metal foil and thereby reduce the thickness of the collector, and hence to further thin the battery, to reduce the weight thereof, and to further improve the energy density thereof.

The shape of the solid electrolyte battery of the present invention is not limited to the above-described square shape but may be any shape. Further, the present invention is applicable to both a primary battery and a secondary battery.

The present invention will be more clearly understood by way of the following examples:

INVENTIVE EXAMPLE

A negative electrode was produced in the following manner.

A negative mix was prepared by mixing 90 parts by weight of a crushed powder of graphite as a negative active material and 10 parts by weight of poly(vinylidene fluoride-co-hexafluoropropylene) as a binder. The negative mix was dispersed in N-methyl-2-pyrrolidone to be slurried. Both surfaces of copper foil having a thickness of 10 $\mu$m as a negative collector was uniformly coated with the slurry of negative mix, and the negative mix was dried and compressed onto the negative collector by a roll press, whereby negative active material layers were formed on both the surfaces of the negative collector. The negative electrode was thus produced.

A positive electrode was produced in the following manner.

To obtain a positive active material (LiCoO$_2$), lithium carbonate and cobalt carbonate were mixed at a mixing ratio of 0.5 mol:1 mol, and were sintered in air at 900° C. for 5 hr. A positive mix was prepared by mixing 90 parts by weight of LiCoO$_2$ as the positive active material thus obtained, 6 parts by weight of graphite as a conductive agent, and 4 parts by weight of poly(vinylidene fluoride-co-hexafluoropropylene) as a binder. The positive mix was dispersed in N-methyl-2-pyrrolidone to be slurried. One surface, excluding an outer peripheral edge portion, of aluminum foil having a thickness of 40 µm as a positive collector was uniformly coated with the slurry of positive mix by a pattern-coating manner, and the positive mix was dried and compressed onto the positive collector by a roll press, whereby a positive active material layer was formed on the one surface, excluding the outer peripheral edge portion, of the positive collector. The positive electrode was thus produced.

A gel-like electrolyte layer was produced in the following manner.

Each of the negative active material layers formed on both the surfaces of the negative collector and the positive active material layer formed on the one surface of the positive collector was uniformly coated with a solution, which was obtained by mixing and dissolving 30 parts by weight of a plasticizer containing 42.5 parts by weight of ethylene carbonate, 42.5 parts by weight of propylene carbonate, and 15 parts by weight of LiPF$_6$, 10 parts by weight of poly (vinylidene fluoride-co-hexafluoropropylene), and 60 parts by weight of dimethyl carbonate, to be impregnated therewith, and were left at room temperature for 8 hr to remove dimethyl carbonate by evaporation. The gel-like electrolyte layers were thus produced.

The negative electrode having the solid electrolyte layers on both the surfaces thereof was, as shown in FIG. 5, held and pressed between the pair of positive electrodes each having the solid electrolyte layer on the one surface thereof.

Finally, positive collector exposed portions formed at the outer peripheral edge portions of the positive electrodes, excluding a negative terminal extraction port, were directly joined to each other by electron beam welding, to thus produce a lithium ion secondary battery having an A5 sheet shape (140 mm×196 mm) and a thickness of 560 µm. Additionally, at the negative terminal extraction port, an acid denatured CPP film having a width of 8 mm and a thickness of 40 µm was previously stuck on the negative terminal. The negative extraction port was sealed at 180° C. under a reduced pressure by using a heat sealer.

Comparative Example

A positive mix was prepared in the same manner as that in Inventive Example. One surface of aluminum foil having a thickness of 20 µm was uniformly coated with the positive mix. The positive mix was dried and compressed onto the aluminum foil by a roll press, to form a positive active material layer on the one surface of the aluminum foil. A positive electrode was thus produced. Subsequently, a negative electrode was produced in the same manner as that in Inventive Example.

Like Inventive Example, a gel-like electrolyte layer was formed on each of the negative active material layers formed on both surfaces of the negative collector and the positive active material layer formed on one surface of the positive collector.

The positive electrode having the gel-like electrolyte layer, the negative electrode having the gel-like electrolyte layers, and the positive electrode having the gel-like electrolyte layer were overlapped to each other with the gel-like electrolyte layers opposed to each other, and were brought into press-contact with each other, to produce a battery element.

The battery element thus produced was inserted in an aluminum laminate film composed of a cast polypropylene layer (30 µm), aluminum foil (40 µm), and a nylon layer (15 µm), and the outer peripheral edge portion of the aluminum laminate film was sealed at 180° C. under a reduced pressure by using a heat sealer, to produce a sheet-like lithium ion secondary battery having a size of 140 mm×200 mm and a thickness of 690 µm.

With respect to the batteries in Inventive Example and Comparative Example, an energy density at the beginning of the charging/discharging cycle and a discharge capacity retention ratio after 500 cycles were measured. The results are shown in Table 1.

TABLE 1

|  | Energy density per weight (Wh/kg) | Energy density per volume (Wh/L) | Discharge capacity retention ratio (%) |
|---|---|---|---|
| Inventive Example | 148 | 310 | 81 |
| Comparative Example | 131 | 290 | 39 |

As is apparent from Table 1, the battery in Inventive Example is superior to the battery in Comparative Example in energy density per weight, energy density per volume, and discharge capacity retention ratio. As a result, it is found that the configuration in which the positive electrode serves as the container is effective to improve the energy density of the battery, and that the configuration in which the positive collector exposed portions are directly joined to each other is effective to positively keep the air-tightness and hence to prevent deterioration of the charging/discharging cycle due to permeation of moisture.

As described above, according to the solid electrolyte battery of the present invention, since the first electrodes serve as the container, it is not required to provide a new terminal for the first electrodes and to provide a new container, and hence to further thin the battery and to further reduce the weight thereof. Since the battery can be mounted on an electronic apparatus without any limitation to the position of the terminal of the first electrodes, it is possible to thin the electronic apparatus and to reduce the weight thereof. Further, since the solid electrolyte battery is sealed by directly joining the collector exposed portions provided at the outer peripheral edge portions of the first electrodes to each other not via a resin for heat seal, it is possible to ensure a significantly desirable air-tightness, and to significantly reduce the areas of the collector exposed portions of the first electrodes. Accordingly, it is possible to realize the thinning, iightweightness, and higher energy density of the solid electrolyte battery, and to enhance the charging/discharging cycle characteristic thereof.

According to the method of producing a solid electrolyte battery of the present invention, since the battery is sealed by directly joining the collector exposed portions of the first electrodes to each other not via a resin for heat seal, it is possible to realize thinning and lightweightness of the battery, and to ensure a significantly desirable air-tightness thereof. Accordingly, it is possible to provide a thin, lightweight solid electrolyte battery having a higher energy density and an excellent charging/discharging cycle characteristic.

While the preferred embodiments of the present invention have been described using the specific terms, such description is for illustrative purposes only, and it is to be understood that changes and variations may be made without departing from the spirit or scope of the following claims.

What is claimed is:

1. A solid electrolyte battery comprising:
a first electrode including a first collector, and a first active material layer formed on one surface of said first collector with an outer peripheral edge portion of said first collector remaining as a collector exposed portion;
a second electrode including a second collector and second active material layers formed on both surfaces of said second collector; and
a solid electrolyte interposed between said first electrode and said second electrode;
wherein said second electrode is held in said first electrode in such a manner that said first active material layer is opposed to each of said second active material layers via said solid electrolyte, and is sealed in said first electrode by joining said collector exposed portion of said first electrode to each other.

2. A solid electrolyte battery according to claim 1, comprising a pair of first electrodes, and said second electrode is held between said first electrodes.

3. A solid electrolyte battery according to claim 1, further comprising an electrode terminal connected to said second electrode, wherein said electrode terminal is led to the outside while being held in the joined portion of said collector exposed portion of said first electrode.

4. A solid electrolyte battery according to claim 3, further comprising a sealing member having electric insulation, which is disposed between said electrode terminal and said first electrode.

5. A solid electrolyte battery according to claim 1, wherein said solid electrolyte is made to gel by using a plasticizer.

6. A solid electrolyte battery according to claim 1, wherein said battery is formed into a sheet having a thickness of 2 mm or less.

7. A solid electrolyte battery according to claim 1, further comprising a separator disposed between said first electrode and said second electrode.

8. A solid electrolyte battery according to claim 1, wherein said first electrode is a negative electrode, and said second electrode is a positive electrode.

9. A solid electrolyte battery according to claim 8, wherein said negative electrode contains lithium, a lithium alloy, or a material into or from which lithium can be doped or released.

10. A solid electrolyte battery according to claim 8, wherein said positive electrode contains a composite oxide of lithium and a transition metal.

11. A solid electrolyte battery according to claim 1, wherein said first electrode is a positive electrode, and said second electrode is a negative electrode.

12. A solid electrolyte battery according to claim 11, wherein said negative electrode contains lithium, a lithium alloy, or a material into or from which lithium can be doped or released.

13. A solid electrolyte battery according to claim 11, wherein said positive electrode contains a composite oxide of lithium and a transition metal.

14. A method of producing a solid electrolyte battery, comprising the steps of:
forming a first active material layer on one surface of a first collector with an outer peripheral edge portion of the first collector remaining as a collector exposed portion, to produce a first electrode;
forming second active material layers on both surfaces of a second collector, to produce a second electrode;
holding the second electrode in the first electrode in such a manner that the first active material layer is opposed to each of the second active material layers via a solid electrolyte; and
joining the collector exposed portion of the first electrode, in which the second electrode has been held in said holding step, to each other, to seal the second electrode in the first electrode.

15. A method of producing a solid electrolyte battery according to claim 14, wherein in said sealing step, the collector exposed portion of said first electrode is joined to each other by either of electron beam welding, laser welding, ultrasonic welding, resistance welding, and pressure welding.

16. A method of producing a solid electrolyte battery according to claim 14, wherein a pair of first electrodes are produced in said first producing step, and in said holding step, the second electrode is held between the pair of first electrodes.

17. A method of producing a solid electrolyte battery according to claim 14, wherein in said holding step, an electrode terminal is connected to the second electrode, and the electrode terminal is led to the outside while being held in the joined portion of the collector exposed portion of the first electrode.

18. A method of producing a solid electrolyte battery according to claim 17, wherein in said sealing step, a sealing member having electric insulation is disposed between the electrode terminal and the first electrode, and a portion, at which the sealing member is disposed, of the collector exposed portion of the first electrode is joined to each other by heat seal via the sealing member.

19. A method of producing a solid electrolyte battery according to claim 14, wherein the solid electrolyte is made to gel by using a plasticizer.

20. A method of producing a solid electrolyte battery according to claim 14, wherein the battery is formed into a sheet having a thickness of 2 mm or less.

21. A method of producing a solid electrolyte battery according to claim 14, further comprising the step of disposing a separator between the first electrode and the second electrode.

22. A method of producing a solid electrolyte battery according to claim 14, wherein the first electrode is a negative electrode, and the second electrode is a positive electrode.

23. A method of producing a solid electrolyte battery according to claim 22, wherein the negative electrode contains lithium, a lithium alloy, or a material into or from which lithium can be doped or released.

24. A method of producing a solid electrolyte battery according to claim 22, wherein the positive electrode contains a composite oxide of lithium and a transition metal.

25. A method of producing a solid electrolyte battery according to claim 14, wherein the first electrode is a positive electrode, and the second electrode is a negative electrode.

26. A method of producing a solid electrolyte battery according to claim 25, wherein the negative electrode contains lithium, a lithium alloy, or a material into or from which lithium can be doped or released.

27. A method of producing a solid eletrolyte battery according to claim 25, wherein producing a solid electrolyte contains a composite oxide of lithium and transition metal.

* * * * *